United States Patent [19]

Kato et al.

[11] Patent Number: 4,636,887
[45] Date of Patent: Jan. 13, 1987

[54] TAPE LOADING AND TENSIONING DEVICE FOR A RECORDING AND/OR REPRODUCING APPARATUS

[75] Inventors: Hiroshi Kato, Chigasaki; Hiromitsu Kubota, Kawasaki, both of Japan

[73] Assignee: Victor Company of Japan, Ltd., Yokohama, Japan

[21] Appl. No.: 545,081

[22] Filed: Oct. 24, 1983

[30] Foreign Application Priority Data

Nov. 1, 1982 [JP] Japan .................. 57-192259

[51] Int. Cl.⁴ .............................................. G11B 15/00
[52] U.S. Cl. ........................................ 360/85; 360/71;
 360/95; 242/75.44; 242/190
[58] Field of Search ................ 360/95, 84, 85, 74.3,
 360/74.4, 71; 242/75.44, 190

[56] References Cited

U.S. PATENT DOCUMENTS

| | | | |
|---|---|---|---|
| 3,345,457 | 10/1967 | MacLeod | 242/75.44 |
| 3,734,426 | 5/1973 | Howes et al. | 242/190 |
| 3,864,742 | 2/1975 | Katoh | 360/85 |
| 3,968,517 | 7/1976 | Chimura et al. | 360/84 X |
| 4,425,590 | 1/1984 | Johnstone et al. | 360/85 X |

FOREIGN PATENT DOCUMENTS

| | | | |
|---|---|---|---|
| 3049166 | 7/1982 | Fed. Rep. of Germany | 242/75.44 |
| 0011015 | 1/1977 | Japan | 360/85 |
| 0167119 | 10/1982 | Japan | 360/84 |

*Primary Examiner*—Robert S. Tupper
*Assistant Examiner*—Andrew L. Sniezek
*Attorney, Agent, or Firm*—Louis Bernat

[57] ABSTRACT

A tape loading device for a recording and/or reproducing apparatus, comprises a loading mechanism for drawing out a tape from a tape cassette which has supply and take-up reels, and for loading the tape unto a predetermined tape path, brakes for respectively braking reel discs which rotate the reels, tension controllers for respectively controlling tensions in the tape which is drawn out from the reels, a detector for detecting an arrival of the loading mechanism to an intermediate position, and a control circuit. The control circuit makes one brake operative and the other brake inoperative during a first half of an operation stage in which the tape is drawn around the periphery of a guide drum, and makes both brakes inoperative and both tension controllers operative during a latter half of the operation stage. The first half of the operation stage continues until the detector detects the arrival of the loading mechanism to the intermediate position, and the latter half of the operation stage continues until the tape loading operation is completed. The one brake brakes one reel disc which rotates one reel from which a certain tape path extends, which certain tape path increases its length as the tape loading operation progresses and is one of a pair of tape paths which are formed as the tape is drawn out from each of the reels.

6 Claims, 5 Drawing Figures

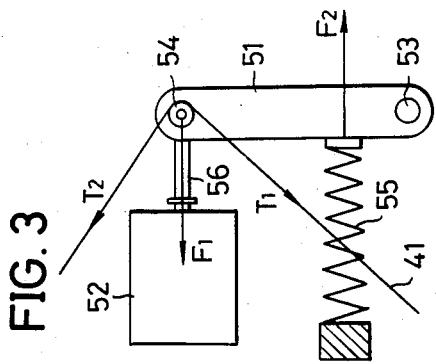
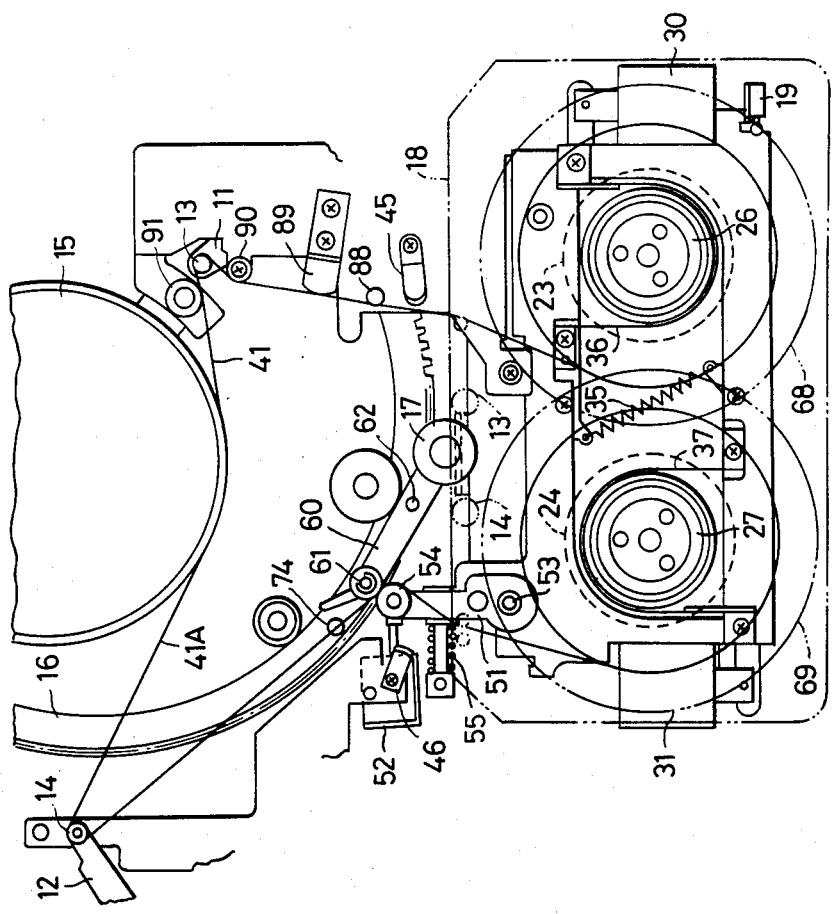

TAPE LOADING AND TENSIONING DEVICE FOR A RECORDING AND/OR REPRODUCING APPARATUS

BACKGROUND OF THE INVENTION

The present invention generally relates to tape loading devices for recording and/or reproducing apparatuses, and more particularly to a tape loading device for a magnetic recording and/or reproducing apparatus which carries out recording and/or reproduction by drawing out a magnetic tape from a tape cassette and loading the magnetic tape unto a tape path in which the magnetic tape is wrapped around a peripheral surface of a guide drum.

In the conventional recording and/or reproducing apparatus (video tape recorder, or VTR) which is loaded with a tape cassette, the apparatus was designed so that a tape loading operation in which a magnetic tape is drawn out of the tape cassette and wrapped around a peripheral surface of a guide drum, is carried out according to one of two methods. According to one method of carrying out this loading operation, the tape tension is not controlled during the loading operation, and the tape is loaded by drawing out the tape from both a supply reel and a take-up reel. According to the other method of carrying out the loading operation, the loading operation is carried out in a state where a constant take-up torque is applied to one reel disc, that is, a take-up reel disc, for example. However, the conventional apparatus having these designs suffered the following disadvantages.

I. Because the tension in the loaded tape changes according to the amount of tape roll remaining on each of the reels, the value of the tension in the tape when the tape is loaded and the value to which the tension is controlled when the tape travels may greatly differ. In such a case, there will be a great change in the tape tension, as the mode of the apparatus changes to a mode in which the tape travels from a state where the tape loading operation is completed. Such a great change in the tape tension will make the change of state, from the state where the tape loading operation is completed to the mode in which the tape travels, unstable.

II. The tape must be wrapped around the peripheral surface of the guide drum in a state where the lower edge of the tape is guided along a tape guide band of the guide drum. Thus, especially in the initial stage in which the tape begins to make contact with the guide drum, the tape which is drawn out of the tape cassette must be supported stably. However, in the conventional apparatus described before, the tape will be drawn out from both the supply reel and the take-up reel within the tape cassette when the tape roll remaining on these reels are substantially the same, and the tape cannot be supported stably in this case. Thus, in such a case, it becomes difficult to wrap the tape around the peripheral surface of the guide drum with precision, and the tape loading operation may fail.

SUMMARY OF THE INVENTION

Accordingly, it is a general object of the present invention to provide a novel and useful tape loading device for a recording and/or reproducing apparatus, in which the above described disadvantages have been overcome.

Another and more specific object of the present invention is to provide a tape loading device which carries out a tape loading operation for drawing out a magnetic tape from a tape cassette and loading the tape unto a predetermined tape path in which the tape is wrapped around a peripheral surface of a guide drum, so that one reel disc is braked and the tape is drawn out from only one reel during a first half of the tape loading operation, and the tape is drawn out from both reels while the tension in the tape is controlled during a latter half of the tape loading operation. According to the tape loading device of the present invention, the tape can be positively wrapped around the peripheral surface of the guide drum in a state where the lower edge of the tape is guided along a tape guide band of the guide drum with precision. In addition, after the tape loading operation is completed, the change of state, from a state where the tape is loaded to a mode of the apparatus in which the tape travels, can be carried out smoothly without accompanying a great change in the tape tension.

Other objects and further features of the present invention will be apparent from the following detailed description when read in conjunction with the accompanying drawings.

BRIEF DESCRIPTION OF THE DRAWINGS

FIG. 2 is a plan view showing the tape loading device shown in FIG. 1 in a state where the operation to draw a magnetic tape out of a tape cassette is completed;

FIG. 3 generally shows a take-up side tension arm mechanism in the device shown in FIGS. 1 and 2;

DETAILED DESCRIPTION

Figure 1:
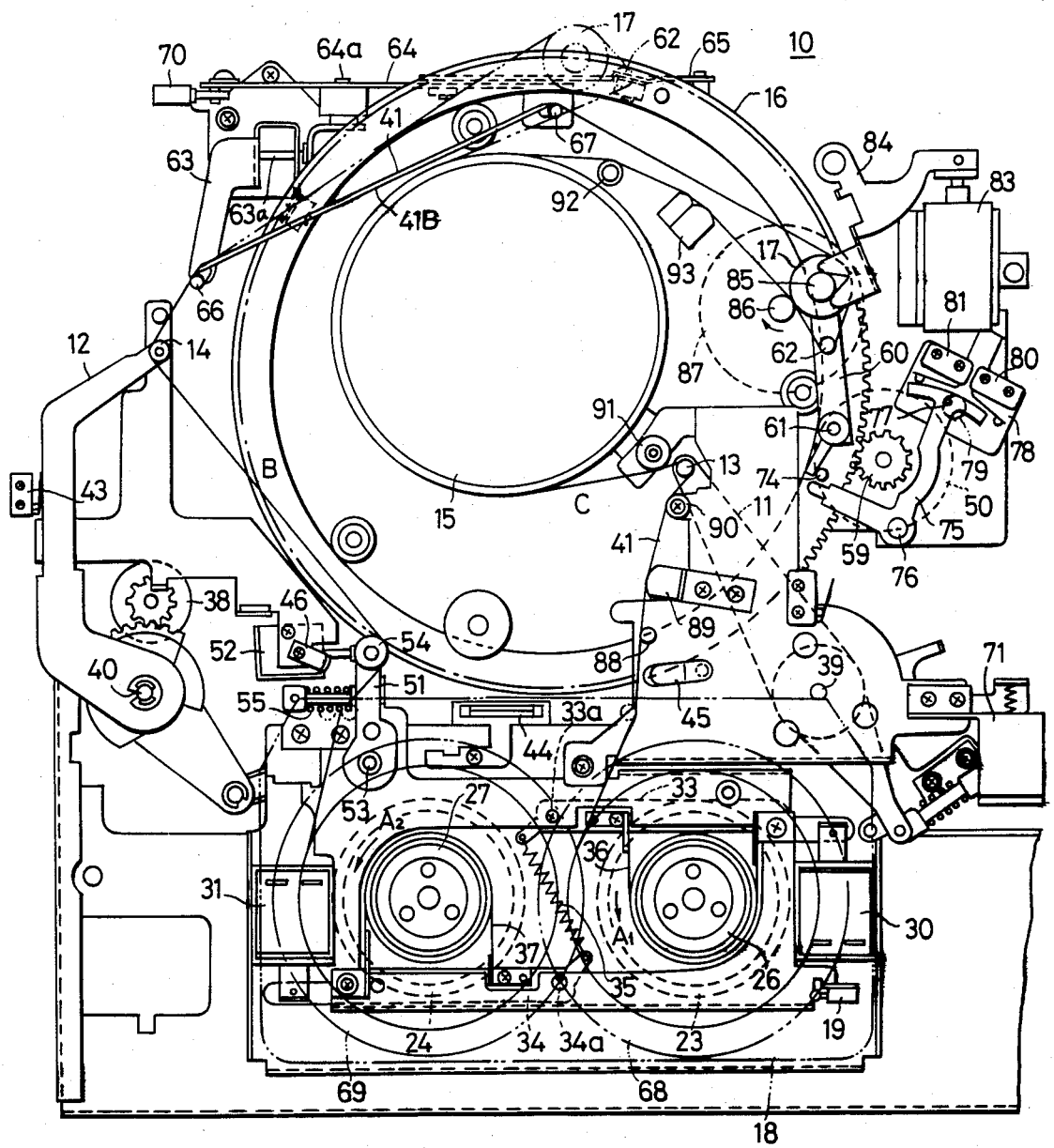
FIG. 1 is a plan view showing an embodiment of a tape loading device according to the present invention, in a state where a tape loading, operation is completed.

FIG. 1 shows a recording and/or reproducing apparatus 10 which is applied with a tape loading device according to the present invention. The apparatus 10 is designed so that a magnetic tape 41 is drawn out of a tape cassette 18 and loaded unto a predetermined tape path, when the tape cassette 18 is loaded into the apparatus 10. This state in which the tape 41 is loaded unto the predetermined tape path, will be referred to as a stop mode of the apparatus. The tape cassette 18 is a standard type tape cassette employing a ¾-inch magnetic tape. The apparatus 10 is designed to start recording and reproduction from the stop mode.

Before the tape cassette 18 is loaded into the apparatus 10, a loading arm 11 which is provided on the supply side and a loading arm 12 which is provided on the take-up side, are respectively located at positions rotated counterclockwise. A loading pole 13 which is arranged at the free end of the loading arm 11, and a loading pole 14 which is arranged at the free end of the loading arm 12, are respectively located at positions indicated by two-dot chain lines in FIG. 1. A loading ring 16 which encircles a guide drum 15, is located at a position rotated counterclockwise. A pinch roller 17 is located at a position shown in FIG. 2.

When the tape cassette 18 is loaded into the apparatus 10, a microswitch 19 detects the loaded tape cassette 18, and the apparatus automatically starts to carry out a predetermined operation after a slight time lag, and video heads which are provided on the guide drum 15 begin to rotate. This predetermined operation comprises two stages of operations. During the first operation stage, the tape 41 is drawn out of the tape cassette 18 to a state shown in FIG. 2. Then, during the second operation stage subsequent to the first operation stage, the tape 41 is loaded to a state shown in FIG. 1.

Figure 4:
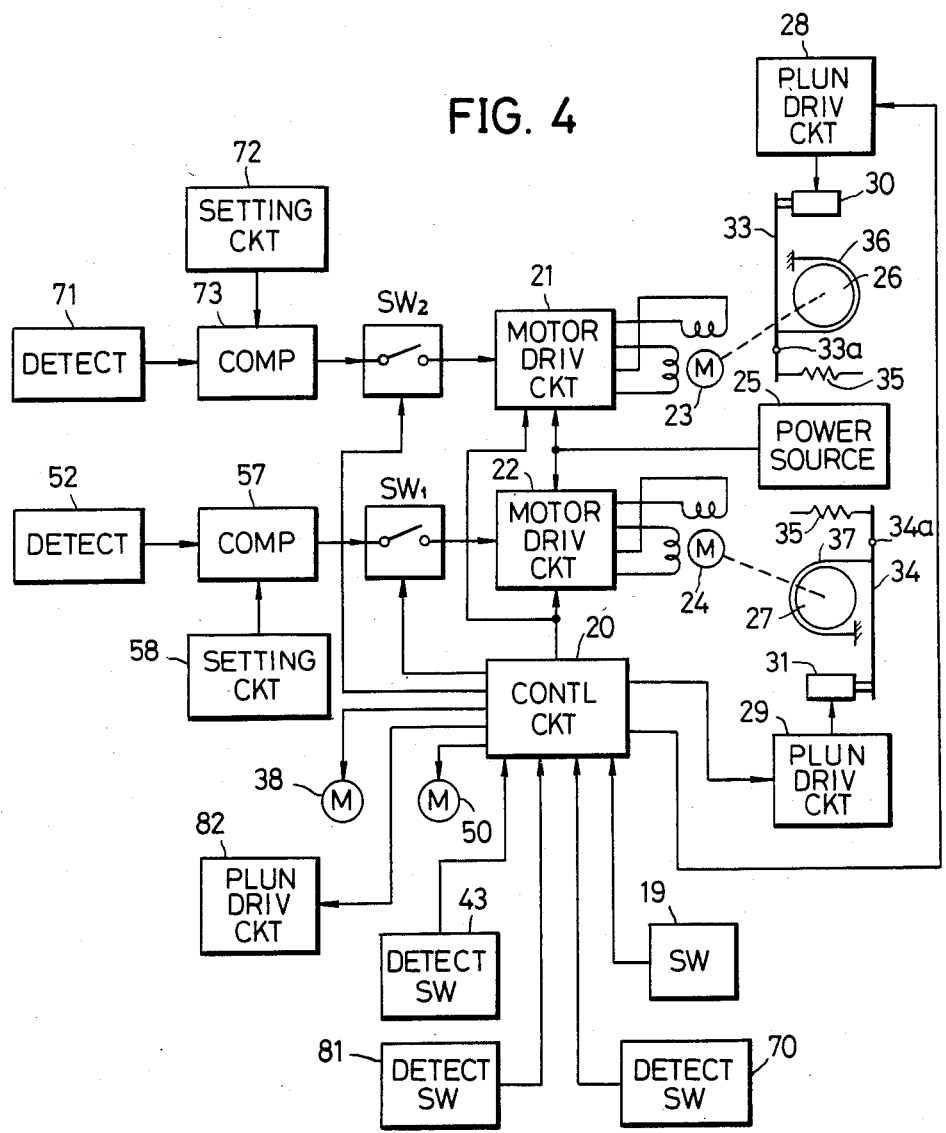
FIG. 4 is a block diagram showing a control system related to the tape leading operation which forms an essential part of the present invention.
Figure 5:
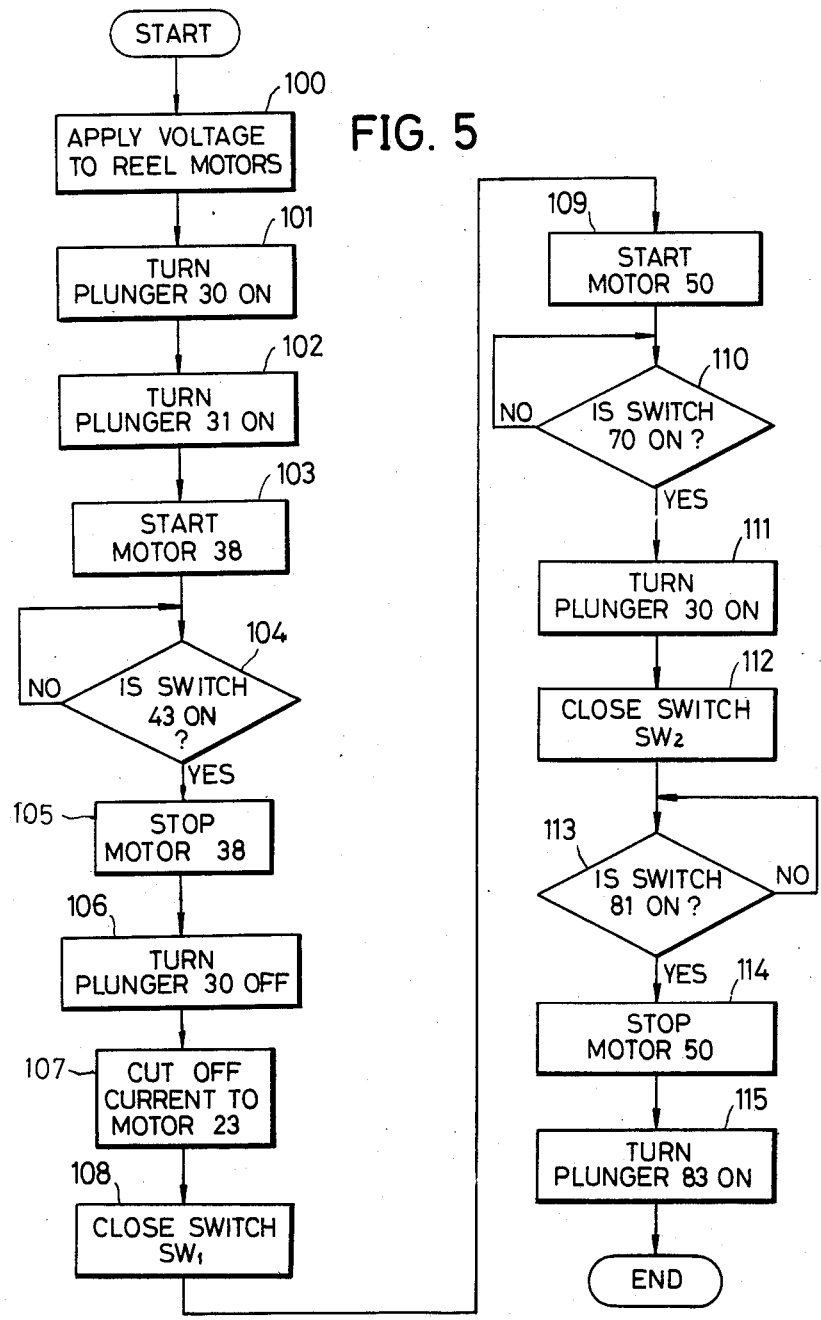
FIG. 5 is a flowchart for explaining the operation of a control circuit in the block diagram shown in FIG. 4.

During the first operation stage, a reel disc system is controlled as will be described hereinafter in conjunction with FIGS. 4 and 5. The control during the first operation stage and the control during the second operation stage which will be described later on in the specification, are respectively carried out by a control circuit 20 shown in FIG. 4 which is made up from a microcomputer.

When the microswitch 19 detects the loaded tape cassette 18, the microswitch 19 supplies a detection signal to the control circuit 20, and the control circuit 20 supplies a signal to motor driving circuits 21 and 22. Thus, a predetermined low voltage from a power source 25, is applied to a supply reel motor 23 and to a take-up reel motor 24 (This operation corresponds to a step 100 in a flowchart shown in FIG. 5. In the description hereinunder, the steps which will be referred to are steps in the flowchart shown in FIG. 5.). As a result, a minimum tape take-up torque in the direction of an arrow $A_1$ in FIG. 1 is applied to a supply reel disc 26 which is directly coupled to the reel motor 23. A minimum tape take-up torque in the direction of an arrow $A_2$ is applied to a take-up reel disc 27 which is directly coupled to the reel motor 24. The minimum tape take-up torques applied to the reel discs 26 and 27, are substantially the same in magnitude.

Next, the control circuit 20 supplies a signal to a plunger driving circuit 28 in a step 101, and supplies a signal to a plunger driving circuit 29 in a step 102. Hence, a plunger 30 for releasing the braking action with respect to the reel disc 26, and a plunger 31 for releasing the braking action with respect to the reel disc 27, are respectively turned ON. Accordingly, a brake arm 33 rotates clockwise about a pin 33a against a force exerted by a spring 35, while a brake arm 34 also rotates clockwise about a pin 34a against the force exerted by the spring 35. Brake bands 36 and 37 are respectively slackened by the clockwise rotation of the brake arms 33 and 34. Thus, the braking actions with respect to the reel discs 26 and 27 are released, and in this state, the same take-up torque is applied to these reel discs 26 and 27.

A signal from the control circuit 20 is supplied to a loading arm motor 38 in a step 103, to start the motor 38. When the motor 38 starts to rotate, the loading arm 11 rotates clockwise about a pin 39, and the loading arm 12 rotates counterclockwise about a pin 40. The loading arms 11 and 12 rotate up to final positions shown in FIGS. 1 and 2. As the loading arms 11 and 12 rotate up to the final positions, these loading arms 11 and 12 intercept the tape 41 and draw out the tape 41 from the tape cassette 18. As a result, the tape 41 forms a tape path 41A in which a part of the tape 41 makes contact with the guide drum 15, and the first operation stage is completed.

As described above, the same tape take-up torque is applied to the reel discs 26 and 27. Hence, the tape 41 is mainly drawn out from the reel with smaller drag, according to the tape roll remaining on a supply reel 68 and a take-up reel 69 within the tape cassette 18. That is, the tape 41 is mainly drawn out from the reel with the smaller tape roll remaining thereon. The tape 41 is under tension in the tape path 41A.

A detection switch 43 detects the completion of the first operation stage. This switch 43 closes when it is pushed by the loading arm 12. In a step 104, the control circuit 20 discriminates the detected result in the switch 43. If the discrimination result in the step 104 is "YES", the control circuit 20 stops the loading motor 38 in a step 105.

A tape end detecting means which comprises a lamp 44, a supply side phototransistor 45, and a take-up side phototransistor 46, operates to detect the state of the tape 41 when the first operation stage is completed. The state in which the tape 41 is wound on the reels within the tape cassette 18 is adjusted according to the needs, based on the detected result in the tape end detecting means. On end of a transparent leader tape is connected to a starting end of the tape 41, and one end of a transparent trailer tape is connected to a terminal end of the tape 41. The other end of the leader tape is fixed to the take-up reel, and the other end of the trailer tape is fixed to the supply reel. Thus, when the trailer tape is detected by the the reel motors 23 and 24 are tape end detecting means, controlled similarly as in a rewind mode of the apparatus 10. On the other hand, when the leader tape is detected by the tape end detecting means, the reel motors 23 and 24 are controlled similarly as in a fast-forward mode of the apparatus 10. The apparatus 10 continues to assume the rewind mode until the trailer tape is no longer detected by the tape end detecting means, and continues to assume the fast-forward mode until the leader tape is no longer detected by the tape end detecting means, before assuming subsequent mode of operation. If the trailer tape and the leader tape are not detected by the tape end detecting means even after the rewind mode or the fast-forward mode is continued for a predetermined time. Then, the apparatus 10 assumes that the tape 41 does not exist, whereby the loading arms 11 and 12 respectively rotate in directions opposite to those described before. In other words, the loading arm 11 rotates counterclockwise, and the loading arm 12 rotates clockwise.

Returning now to the description related to the switch 43, the control circuit 20 turns the plunger 30 OFF in a step 106, when the switch 43 is turned ON. Accordingly, the brake arm 33 rotates counterclockwise due to the force exerted by the spring 35, and the supply reel disc 26 is braked. At the same time, the control circuit 20 cuts off the current to the supply reel motor 23 in a step 107. In addition, the control circuit 20 supplies a signal to a switch $SW_1$ in a step 108, to close this switch $SW_1$ Hence, a control mechanism for controlling the tape tension on the take-up side, which will be described hereinafter, is made operative.

Description will now be given with respect to the construction and operation of a take-up side tension arm 51 and a tension detector 52 which comprises a differential transformer, by referring to FIG. 3. The tension arm 51 is pivotally supported on a pin 53. A tape guide roller 54 is located at one end of the tension arm 51. The tension arm 51 is urged clockwise by a compressed coil spring 55, that is, in a direction so as to increase the length of the tape path 41A, and is also urged in a direction so as to separate from a detecting rod 56 of the, detector 52. Tensions $T_1$ and $T_2$ in the tape 41, act as a resultant of forces $F_1$ on the guide roller 54. Therefore, the tension arm 51 assumes a position where the counterclockwise rotational torque due to the resultant of forces $F_1$ and the clockwise rotational torque due to a force $F_2$ exerted by the spring 55 are balanced. The voltage applied to the take-up reel motor 24 is controlled according to a tension signal from the detector 52. For this reason, the tensions $T_1$ and $T_2$ in the tape 41 in the vicinity of the guide roller 54, are respectively controlled to assume predetermined values.

The tension signal from the detector 52, which is in accordance with the rotational position of the tension arm 51, and a reference tension signal from a reference tension setting circuit 58 which comprises a variable resistor, are compared in a comparator 57. An output signal of the comparator 57 is supplied to the motor driving circuit 22, through the switch $SW_1$ which is closed. The voltage from the power source 25 is controlled in the motor driving circuit 22 according to the output signal of the comparator 57, and the take-up reel motor 24 is applied with the controlled voltage from the motor driving circuit 22. The tension in the tape 41 at a position B shown in FIG. 1, is therefore controlled to a reference value.

The control circuit 20 starts a loading motor 50 in a step 109. When the motor 50 starts to rotate, the loading ring 16 is driven by a gear 59 and is rotated clockwise. The second operation stage is started in a state where the supply reel disc 26 is braked, and the tape tension on the take-up side can be controlled. A pinch roller arm 60 is pivotally supported on the loading ring 16 by a pin 61. A return roller 62 and the pinch roller 17, are respectively provided on the arm 60. As the loading ring 16 rotates, the tape 41 forming the tape path 41A is intercepted by the return roller 62 and is drawn around the periphery of the guide drum 15 so that the tape 41 makes contact with the peripheral surface of the guide drum 15. Further, as the loading ring 16 rotates, an arm 63 is rotated about a pin 63a by a cam (not shown) which is provided on the bottom surface of the loading ring 16. Moreover, an arm 65 is pushed and rotated by the cam of the loading ring 16, and an arm 64 is rotated about a pin 64a. As a result, guide poles 66 and 67 enter within a loop formed by the tape 41, so as to guide the tape 41. When the loading ring 16 rotates by approximately ½ revolution and the return roller 62 reaches a position indicated by a two-dot chain line in FIG. 1, the operation to wrap the tape 41 around the peripheral surface of the guide drum 15 is essentially completed. The first half of the second operation stage is thus completed.

In this state, the supply reel disc 26 is braked. Hence, the tape 41 will not be drawn out from the supply reel 68, and the tape 41 will only be drawn out from the take-up reel 69 in a state where the tape tension is controlled.

Generally, a tape guide is formed on the peripheral surface of the guide drum 15. This tape guide is provided in order to guide the tape 41 in a spiral manner. However, when guiding the tape 41 so as to make contact with the peripheral surface of the guide drum 15, the lower edge of the tape 41 could easily run off the tape guide which would lead to a loading operation failure. Such a loading operation failure easily occurs, especially during the second operation stage when the tape 41 travels while making contact with the peripheral surface of the guide drum 15. Accordingly, it is desirable to load the tape 41 unto a predetermined tape path so that the tape 41 does not make contact with the peripheral surface of the guide drum 15 during this loading of the tape 41.

In the present embodiment of the invention, the length of the tape 41 extending from the take-up reel 69 to the return roller 62 increases as the loading ring 16 rotates, because the loading ring 16 rotates clockwise, as will be described later on in the specification. Thus, in the present embodiment, the tape 41 is only drawn out from the take-up reel 69 during the second operation stage in which the tape 41 is wrapped around the peripheral surface of the guide drum 15, and the supply reel disc 26 is braked so that the tape 41 is not drawn out from the supply reel 68. In other words, the increase in the length of the tape 41 extending from the take-up reel 69 to the return roller 62 as the loading ring 16 rotates, is supplied by the tape 41 which is paid out from the take-up reel 69.

Accordingly, as the loading ring 16 rotates and the return roller 62 intercepts the tape 41 in the tape path 41A before reaching the position indicated by the two-dot chain line in FIG. 1, the length of the tape 41 which is drawn out of the tape cassette 18 increases. However, the increase in the length of the tape 41 is only supplied by the tape 41 which is paid out from the take-up reel 69, and the tape 41 is not paid out from the supply reel 68. Hence, even when the second operation stage is carried out, in which tape 41 is wrapped around the peripheral surface of the guide drum 15 as the loading ring 16 rotates, the second operation stage will be carried out in a state where the tape 41 does not travel as it makes contact with the peripheral surface of the guide drum 15. As a result, the lower edge of the tape 41 will not run off the tape guide of the guide drum 15, and the tape path along the peripheral surface of the guide drum 15 can be stably formed with precision in a state where the lower edge of the tape 41 is correctly guided by the tape guide.

When the first half of the second operation stage is completed as described above and the arm 64 rotates to the position indicated by the two-dot chain line in FIG. 1, a detection switch 70 closes and it is detected that the arm 64 has entered a tape loading end zone. The tape loading end zone is a zone existing clockwise beyond the position of the return roller 62 which is indicated by the two-dot chain line in FIG. 1. The control circuit 20 discriminates whether the return roller 62 has entered the tape loading end zone in a step 110. If the discriminated result in the step 110 is "YES", the control circuit 20 supplies a signal to the plunger 30 in a step 111, to turn the plunger 30 ON. Thus, the braking action with respect to the supply reel disc 26 is released. The control circuit 20 supplies a signal to a switch $SW_2$ in a step 112, to close this switch $SW_2$. As a result, a tension signal which is actually detected in a tension detector 71 which comprises a differential transformer, and a reference tension signal from a reference tension setting circuit 72, are compared in a comparator 73. An output signal of this comparator 73 is supplied to the motor driving circuit 21 through the switch $SW_2$. The voltage from the power source 25 is controlled in the motor driving circuit 21 according to the output signal of the comparator 73, and the supply reel motor 23 is applied with the controlled voltage from the motor driving circuit 21. The tension in the tape 41 at a position C shown in FIG. 1, is therefore controlled to a reference value.

Hence, the latter half of the second operation stage in which the tape 41 is drawn around the periphery of the guide drum 15, is started from a state where the return roller 62 is located at the position indicated by the two-dot chain line in FIG. 1. During this latter half of the second operation stage, the tape 41 is drawn out from both the take-up reel 69 and the supply reel 68, in a state where the tape tension at the positions B and C are respectively controlled.

When the latter half of the second operation stage is completed and a tape path 41B which will be described later on in the specification is formed, the tension in the tape 41 which is drawn out from the take-up reel 69 and the tension in the tape 41 which is drawn out from the supply reel 68 are respectively controlled to the reference value described before. When the tape path 41B is formed within the apparatus 10, the apparatus 10 is in a state where the recording or reproduction can be started smoothly by manipulating a recording or reproduction switch, without accompanying a great change in the tape tension as the tape 41 begins to travel.

During the latter half of the second operation stage, the tape 41 is also drawn out from the supply reel 68 as the return roller 62 rotates within the tape loading end zone. Thus, the part of the tape 41 which is making contact with the peripheral surface of the guide drum 15, slides over the peripheral surface of the guide drum 15. However, in this stage of the tape loading operation, the operation to wrap the tape 41 around the peripheral surface of the guide drum 15 is essentially completed, and it is unlikely that the lower edge of the tape 41 will run off the tape guide of the guide drum 15. Therefore, the tape 41 is kept wrapped around the peripheral surface of the guide drum 15, and no inconveniences will be introduced.

As the loading ring 16 rotates by approximately ¼ revolution during the latter half of the second operation stage, a pin 74 which is provided on the loading ring 16 pushes one arm part of an L-shaped detecting arm 75 as shown in FIG. 1. Thus, the detecting arm 75 rotates counterclockwise about a pin 76, up to a position where a pin 77 which is provided on the other arm part of the detecting arm 75 engages with one corner part of a hexagonal hole 79 which is formed in a microswitch mount 78. As a result, a detection switch 80 which detects the end of a tape unloading operation is turned OFF, and a detection switch 81 which detects the end of a tape loading operation is turned ON. The end of the tape loading operation is therefore detected.

The control circuit 20 discriminates whether the detection switch 81 is ON, in a step 113. If the discriminated result in the step 113 becomes "YES", the control circuit 20 stops the loading motor 50 which has a built-in clutch, in a step 114. The control circuit 20 supplies a signal to a plunger driving circuit 82 in a step 115, to turn a plunger 83 ON. When the plunger 83 is turned ON, an arm 84 rotates clockwise, and a pin 85 of the pinch roller 17 is pushed by a V-shaped groove in the arm 84. Accordingly, the pinch roller 17 is pressed against a capstan 86.

The tape path 41B shown in FIG. 1 is formed when the loading operation is completed. In the tape path 41B, the tape 41 is drawn out from the supply reel 68 within the tape cassette 18, and is guided by a guide pole 88. Then, the tape 41 makes contact with an erasing and time code recording and reproducing head 89, and is guided by a guide pole 90 and the loading pole 13. The tape 41 is thereafter wrapped around the peripheral surface of the guide drum 15 in a spiral manner, over a predetermined angular range which is determined by guide poles 91 and 92. Further, the tape 41 makes contact with an audio and control head 93, and is pinched between the capstan 86 and the pinch roller 17. The traveling direction of the tape 41 is changed by substantially 180° by the return roller 62, and the tape 41 is then guided by the guide poles 67 and 66. The tape 41 is guided by the loading pole 14 and the guide roller 54, before finally reaching the take-up reel 69 within the tape cassette 18.

In the above state, the voltages continue to be applied to the reel motors 23 and 24. A capstan motor 87 remains stopped. Thus, although the tape 41 is pinched between the capstan 86 and the pinch roller 17, the tape 41 does not travel. In this state, the apparatus 10 is in the stop mode which was described previously.

The rotational position of the loading ring 16 when the detection switch 70 detects the beginning of the loading end zone and closes, that is, the positions of the pinch roller 17 and the return roller 62 indicated by the two-dot chain lines in FIG. 1, is selected so that the value of the tape tension at the positions C and B (especially the position C) actually assumes the reference value as the loading ring 16 rotates beyond this rotational position and reaches the final position where the tape loading operation is completed. In other words, this rotational position of the loading ring 16 is selected to a specific position which is reached before the final position, where the interval between this specific position and the final position corresponds to an interval of the tape loading operation which is required to actually control the value of the tape tension to the reference value from the time when the control mechanism which controls the tape tension begins to operate. In the present embodiment, this rotational position of the loading ring 16 is selected to a position where the operation to wrap the tape 41 around the peripheral surface of the guide drum 15 is substantially completed.

When the recording or reproduction switch is manipulated in the stop mode of the apparatus 10, the capstan motor 87 starts to rotate, and the capstan 86 begins to rotate clockwise as indicated by an arrow in FIG. 1. The tape 41 is pinched between the capstan 86 and the pinch roller 17, and is driven to travel in a forward direction. In this state, the tape 41 is drawn out from the supply reel 68 while the tape tension at the position C is controlled by the supply reel motor 23. A video signal is recorded onto or reproduced from the tape 41 while the tape 41 makes contact with the peripheral surface of the guide drum 15. Thereafter, the tape 41 is taken up by the take-up reel 69 while the tape tension at the position B is controlled by the take-up reel motor 24. Before the tape 41 starts to travel, the tension in the tape 41 assumes a value which is expected when the tape travels, as described heretofore. Accordingly, the tape 41 can start to travel stably, without accompanying a great change in the tape tension. For this reason, the mode of the apparatus 10 can be changed smoothly to the recording or reproduction mode, from the stop mode.

Effects similar to those described heretofore, can also be obtained by performing the first half of the second operation stage in a state where the control system which controls the tape tension in the take-up reel side is kept inoperative, and a minimum driving force is applied to the take-up side reel motor 24 while a minimum tape take-up torque is applied to the take-up reel 69. In this case, the control system which controls the tape tension in the take-up reel side is made operative during the latter half of the second operation stage.

There are apparatuses which carry out the tape loading operation by rotating the loading ring counterclockwise which is opposite to the rotating direction of the loading ring in the embodiment described heretofore. In such apparatuses, the length of the tape which is drawn out from the supply reel increases as the loading ring rotates. Thus, in such apparatuses, the apparatus must be designed so that the take-up reel is braked and the tape is only drawn out from the supply reel during the first half of the second operation stage, and so that the braking action with respect to the take-up reel is released and the control systems which respectively control the tape tension on the supply reel side and the take-up reel side are made operative during the latter half of the second operation stage.

Further, the present invention is not limited to these embodiments, but various variations and modifications may be made without departing from the scope of the present invention.

What is claimed is:

1. A tape loading and tensioning device for a recording and/or reproducing apparatus, said tape loading and tensioning device comprising:
    tape loading means for drawing out a tape from a tape cassette which has a supply reel and a take-up reel, and for loading said tape unto a predetermined tape path in which said tape is wrapped around a predetermined angular range on a peripheral surface of a guide drum;
    first braking means for braking a supply reel disc which rotates said supply reel;
    second braking means for braking a take-up reel disc which rotates said take-up reel;
    first tension control means for controlling a tension in the tape which is drawn out from said supply reel;
    second tension control means for controlling a tension in the tape which is drawn out from said take-up reel;
    detecting means for detecting an arrival of said tape loading means at an intermediate position; and
    control means for making one of said first and second braking means operative and the other of said first and second braking means inoperative during a first half of an operation stage in which said tape is wrapped around the periphery of said guide drum, and for subsequently making said one of said first and second braking means inoperative during a latter half of the operation stage, and for making both of said first and second tension control means operative during the latter half of the operation stage, said first half of the operation stage continuing until said detecting means detects the arrival of said tape loading means at said intermediate position, said latter half of the operation stage starting from an end of said first half of the operation stage and continuing until the tape loading operation is completed,
    said tape loading means drawing out the tape from only one of said supply and take-up reels which is in correspondence with said other braking means which is made inoperative, during said first half of the operation stage.

2. The tape loading and tensioning device as claimed in claim 1 in which said control means makes one of said first and second tension control means operative during said first half of said operation stage, said one tension control means being provided correspondingly to said other braking means which is made inoperative during said first half of said operation stage.

3. The tape loading and tensioning device as claimed in claim 1 in which said tape loading means draws out said tape from said tape cassette so that the length of a tape path which is formed by drawing out said tape from said take-up reel and guiding said tape to reach said guide drum increases, and said control means makes said second braking means inoperative and said first braking means operative during said first half of the operation stage, and makes both of said first and second braking means inoperative by making said first braking means inoperative and makes both of said first and second tension control means operative during said latter half of the operation stage.

4. The tape loading and tensioning device as claimed in claim 1 in which said tape loading means draws out said tape from said tape cassette so that the length of a tape path which is formed by drawing out said tape from said take-up reel and guiding said tape to reach said guide drum increases, and said control means makes said second braking means inoperative, said first braking means operative, and said second tension control means operative during said first half of the operation stage, and makes both of said first and second braking means inoperative by making said first braking means inoperative and makes both of said first and second tension control means operative during said latter half of the operation stage.

5. The tape loading and tensioning device as claimed in claim 1 in which said tape loading means controls the value of the tape tension relative to a reference value during said latter half of the operation stage.

6. The tape loading and tensioning device as claimed in claim 1 in which said tape loading means substantially completes an operation of wrapping said tape around the peripheral surface of said guide drum during said first half of said operation stage.

* * * * *